United States Patent [19]

Vodoklys

[11] 3,773,681

[45] Nov. 20, 1973

[54] METHOD FOR IMPROVING THE PERFORMANCE OF HALOPHOSPHATE PHOSPHOR

[75] Inventor: Frank M. Vodoklys, Wayne, N.J.

[73] Assignee: Westinghouse Electric Corporation, Pittsburgh, Pa.

[22] Filed: June 11, 1971

[21] Appl. No.: 152,080

[52] U.S. Cl. ......................................... 252/301.4 P
[51] Int. Cl. .............................................. C09k 1/36
[58] Field of Search ............................. 252/301.4 P

[56] References Cited
UNITED STATES PATENTS

| | | | |
|---|---|---|---|
| 3,030,313 | 4/1962 | Alles ............................. | 252/301.4 R |
| 3,468,811 | 9/1969 | Ouweltjes et al. ............. | 252/301.4 P |
| 3,575,876 | 4/1971 | Piper ............................. | 252/301.4 P |
| 3,586,635 | 6/1971 | Vanik et al. ................... | 252/301.6 F |
| 3,597,366 | 8/1971 | Graff et al. .................... | 252/301.4 P |

Primary Examiner—Oscar R. Vertiz
Assistant Examiner—J. Cooper
Attorney—A. T. Stratton, W. D. Palmer and D. S. Buleza

[57] ABSTRACT

Method for improving the performance of fluorescent lamps which incorporate halophosphate phosphor. In practicing this method, after the phosphor is initially prepared, a predetermined small amount of antimony trifluoride is mixed with the phosphor and the mixture is refired under predetermined conditions. The refired material is then processed into finely divided form suitable for a coating onto the envelopes of fluorescent lamps.

7 Claims, 6 Drawing Figures

INVENTOR
Frank M. Vodoklys

BY W.D. Palmer
ATTORNEY

METHOD FOR IMPROVING THE PERFORMANCE OF HALOPHOSPHATE PHOSPHOR

BACKGROUND OF THE INVENTION

This invention generally relates to halophosphate phosphor as used in fluorescent lamps and, more particularly, to a method for processing halophosphate phosphor in order to improve the performance of the lamps which incorporate such phosphor.

Halophosphate phosphor materials for fluorescent lamps are well known and are described in U.S. Pat. No. 2,488,733 dated Nov. 22, 1949 to McKeag and Ranby. These halophosphate phosphor materials are generally analogous to the natural apatite and are thus termed as apatite-structured. Briefly, halophosphate phosphors can be represented by the matrix: $3M_3(PO_4)_2 \cdot 1M'L_2$ where L represents a halogen or mixture of halogens and M and M' represent either different or identical bi-valent metals or mixtures of such metals. In practice, the primary matrix metallic constituent for most halophosphate phosphor is calcium although strontium can be used to replace a part or all of the calcium. The halide constituent normally comprises calcium or strontium chlorides or fluorides or mixtures of both and the matrix is normally activated by antimony or antimony plus manganese. The great majority of fluorescent lamps which are now manufactured in this country use such an apatite-structured halophosphate phosphor.

The fluorescent lamp industry is highly competitive and the state of the art has placed much stress on output and efficiency of the lamps. As a consequence, any improvement which will result in any appreciable increase in output and efficiency is useful in promoting one lamp over another competitive lamp.

U.S. Pat. No. 2,727,864, dated Dec. 20, 1955 discloses that halophosphate phosphor can be treated after it is fully prepared by adding thereto from 0.1 percent to 5 percent by weight of the phosphor of antimony oxychloride or combined antimony oxychloride and antimony trioxide. The resulting mixture, however, is not further processed and is coated onto the lamp envelope as a mixture of phosphor and additive antimony oxychloride. It is theorized that the additive oxychloride reacts with mercury oxide deposit to form colorless compound, thereby preventing veiling of the phosphor due to the deposition of mercury oxide.

It is disclosed in U.S. Pat. No. 3,430,090, dated Feb. 25, 1969, to incorporate with a halophosphate phosphor a limited amount of cadmium with very limited amounts of selected rare earth additive materials.

SUMMARY OF THE INVENTION

In accordance with the present invention, the performance of an antimony-activated or antimony plus manganese-activated apatite-structured matrix of halophosphate phosphor, as used in fluorescent lamps, is improved by the following method: After the phosphor has initially been prepared by reacting the raw mix constituent therefor under predetermined conditions to render same luminescent, and the prepared phosphor is in finely divided status, there is mixed therewith a predetermined small amount of finely divided antimony trifluoride. In the case the initial processing of the phosphor has included precipitation from solution of phosphor raw-mix constituent, the phosphor matrix having activator incorporated therein, the antimony trifluoride is added in amount of from 0.07 percent to 1.3 percent by weight of the phosphor. In the case the phosphor has initially been prepared by firing phosphor solid-state raw-mix constituents under predetermined conditions, the antimony trifluoride is added in amount of from 0.07 percent to 0.85 percent by weight of the phosphor. The resulting mixture is then fired in an inert atmosphere at a temperature of from about 925°C to about 1,200°C for a period of from about one-quarter hour to about 3 and one-half hours. The resulting fired material is then processed into finely divided form suitable for coating onto the envelopes of fluorescent lamps. The performance of the resulting phosphor is appreciably improved as indicated by improved output of the lamps which incorporate the phosphor.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENTS

Figure 1:
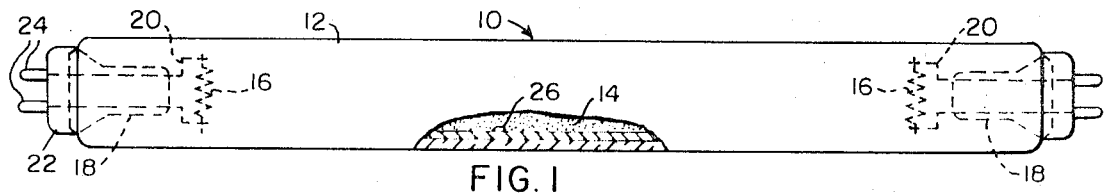
FIG. 1 is an elevational view, partly broken away, illustrating a fluorescent lamp which incorporates halophosphate phosphor processed in accordance with the present invention.

With specific reference to the form of the invention illustrated in the drawings, the numeral 10 in FIG. 1 designates a fluorescent lamp comprising a tubular, vitreous envelope 12 coated internally with phosphor 14 which has been processed in accordance with the present invention. Sealed at each end of the envelope 12 are mounts, each comprising an electrode 16, reentrant stem press 18, and lead-in conductors 20. Base caps 22 and base pins 24 are provided at the envelope ends. As is customary, the envelope contains a small charge of mercury 26 and a filling of inert, ionizable gas such as four torrs of argon.

In accordance with the present invention, the phosphor is initially prepared by reacting the raw-mix constituents therefor under predetermined conditions, in order to render same luminescent. The phosphor can be initially prepared either by firing the phosphor raw-mix constituents in solid-state form, which is the usual method, or by precipitating from a solution of the raw-mix constituents the phosphor matrix which has the activator incorporated therein. Of course the phosphor matrix comprises the alkaline-earth metal phosphate and alkaline-earth metal halide wherein the gram-atom ratio of metal to phosphorus is approximately 5:3. There is incorporated into this matrix an antimony activator or activator of antimony plus manganese and a small addition of cadmium has been found desirable.

First considering the conventional procedure whereby the raw-mix constituents are in solid-state form, a so-called blue halophosphate is prepared by reacting the following proportions of ingredients: 4.7 moles CaO, 1.5 moles $P_2O_5$, 0.1 mole antimony; 1.0 mole fluorine; 0.5 mole chlorine; and .05 mole cadmium. In accordance with conventional practices, the calcium and phosphorus are usually added as a mixture of dicalcium phosphate and calcium carbonate. Antimony is added as the trioxide, the fluorine and chlorine are added as calcium halides, and the cadmium is added as the carbonate. The resulting mixture is fired in atmosphere of nitrogen for about 3 hours at a temperature of about 1,200°C. If 0.05 mole manganese is added as the carbonate to the foregoing mixture, the resulting material will be a so-called blue-white halophosphate. By increasing the manganese content to 0.08 mole in the foregoing example, the resulting phosphor emission is shifted somewhat to provide a so-called cool-white halophosphate. By increasing the manganese content 0.12 mole in the foregoing example, the emission is shifted to provide a so-called white halophosphate. By further increasing the manganese content to 0.17 mole, the emission is shifted to provide a so-called warm white halophosphate.

Figure 2:
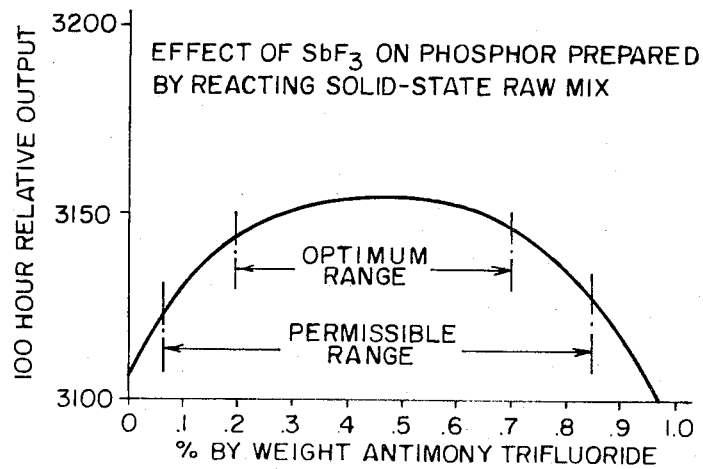
FIG. 2 is a graph of relative output versus weight percent of added antimony trifluoride illustrating the improved lamp performance for refired phosphor which is initially processed by reacting solid-state raw-mix constituents.

After preparation in accordance with the foregoing conventional practices, the fired material is hammer-milled or otherwise reduced to finely divided form. There is then added to the prepared phosphor finely divided antimony trifluoride in amount of from 0.07 percent to 0.85 percent by weight of the phosphor, and preferably, the antimony trifluoride is added in amount of from 0.2 percent to 0.7 percent by weight of the phosphor. A specific example of this addition is 0.5 percent by weight of the phosphor. The effect of varying the amount of addition of antimony trifluoride for this phosphor is shown in FIG. 2.

Figure 4:
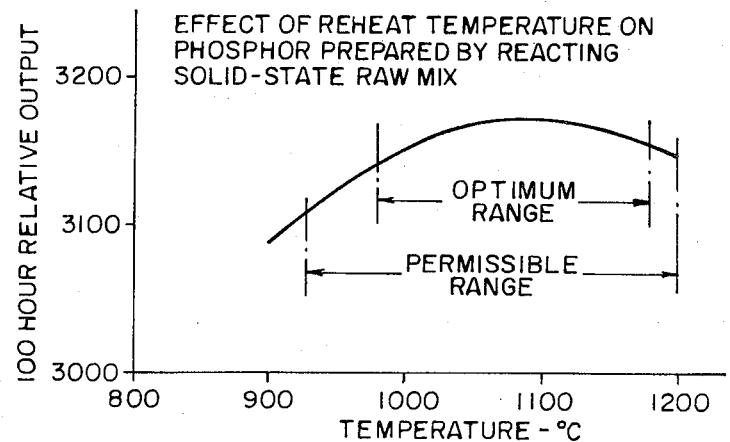
FIG. 4 is a graph of a relative output versus temperature illustrating the effect on lamp output of varying the reheat or refiring temperature of the phosphor-fluoride mixture for phosphor which is initially processed by firing solid-state raw-mix constituents.

The phosphor and antimony trifluoride are thoroughly mixed together and the mixture is then fired at a temperature of from about 925°C to about 1,200°C, and the effect of varying the firing or reheat temperature on the performance of lamps which incorporate the phosphor is shown in FIG. 4. The preferred firing temperature range is from about 980°C to 1,180°C and a specific example of firing temperature is 1,080°C. In taking the data for the curve shown in FIGS. 4 and 5, the antimony trifluoride addition was maintained at 0.2 percent by weight of the phosphor. Refiring temperatures greater than about 1,200°C tend to produce excessively hard material.

Figure 6:
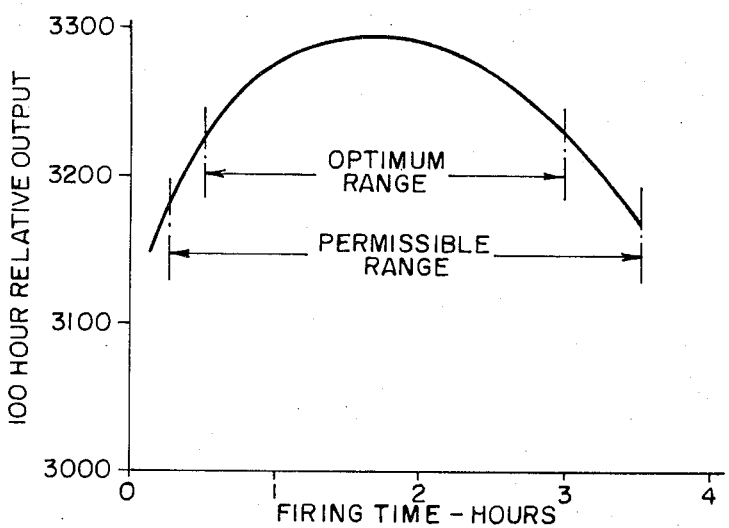
FIG. 6 is a graph of relative output versus firing time illustrating the effect on lamp output of varying the firing time of the mixed phosphor and fluoride.

The time which the phosphor-antimony trifluoride mixture is fired also has an effect on output and this is shown in FIG. 6. The time of firing can be varied from one-quarter to 3 ½ hours and preferably the time of firing is from one-half hour to 3 hours. The specific firing time is 1 ½ hours. In taking the data shown in FIG. 6, the firing temperature was maintained at 1,050°C.

After the fired mixture is cooled, the phosphor is processed into finely divided form suitable for coating onto the envelopes of fluorescent lamps and the performance curves shown in FIGS. 2 through 6 were all taken for 40 watt fluorescent lamps coated with phosphor prepared in accordance with the varying antimony trifluoride additions, firing temperatures and firing time, as indicated.

In accordance with conventional practices for processing the fired material into finely divided form suitable for a coating onto the envelopes of fluorescent lamps, after cooling the fired material is initially rolled to remove large lumps, the rolled phosphor is ball-milled and the ballmilled phosphor is acid washed, such as in a 0.1 normal nitric acid solution. The phosphor is then water rinsed, the rinsed phosphor suspended in water as a slurry, and the resulting slurry is spray dried. The foregoing general procedure is outlined in detail in U.S. Pat. No. 3,023,339 dated Feb. 27, 1962. Of course, other conventional methods for processing the fired phosphor into finely divided form suitable for envelope coating would also be acceptable.

It is is also known to initially process the phosphor by precipitating from a solution of the phosphor raw-mix constituents, the phosphor matrix which has activator material incorporated therein. Such a procedure is disclosed in U.S. Pat. No. 3,538,014 dated Nov. 3, 1970. An alternative method for forming a precipitated halophosphate phosphor is disclosed in copending application Ser. No. 71,204, filed Sept. 10, 1970, now abandoned and owned by the present assignee. In practicing this method, a first solution is prepared which contains the alkaline-earth metal constituents as the acetate, for example, along with ammonium chloride. A second solution is prepared which contains the phosphate radical as diammonium phosphate along with ammonium chloride. The selected metallic activating constituent or constituents are included in activating proportions in one or both of the solutions, which solutions are then mixed and heated. The apatite-structured, activator-doped alkaline earth metal halogen-phosphate matrix is precipitated from the mixed solutions and ammonium fluoride is added thereto. The precipate is then separated and is heated to optimize the luminescence of the phosphor.

Figure 3:
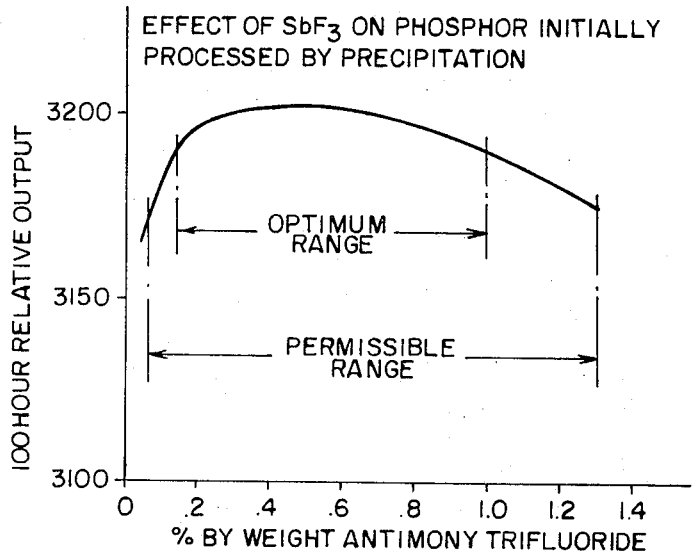
FIG. 3 is a graph similar to FIG. 2 except that the phosphor is initially processed by precipitating from raw-mix solution the phosphor matrix with activator incorporated therein.
Figure 5:
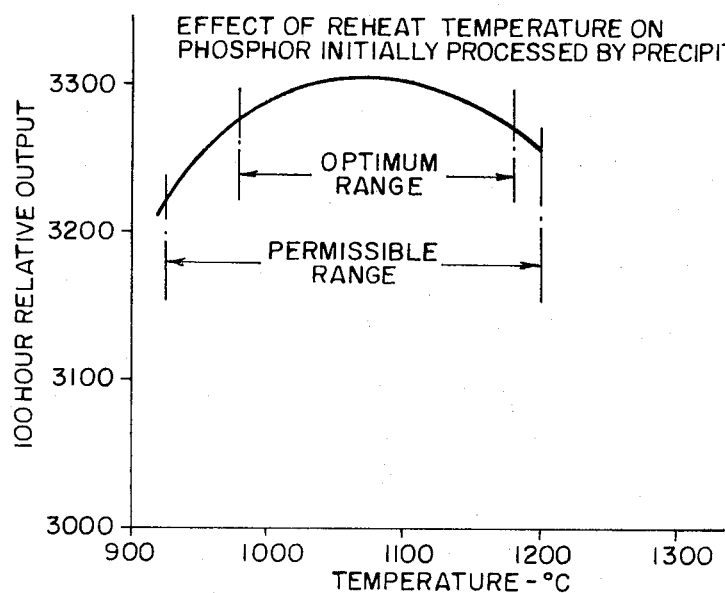
FIG. 5 is a graph similar to FIG. 4 except that the phosphor is intially processed by precipitating from solution the phosphor matrix with activator incorporated therein.

In accordance with the present invention, when the phosphor has initially been processed by precipitating the phosphor matrix which incorporates the activator, the antimony trifluoride in finely divided form is added in amount of from about 0.07 to 1.3 percent by weight of the phosphor. The effect of varying the amount of antimony trifluoride addition is shown in FIG. 3. Preferably the antimony trifluoride is added in amount of from 0.15 percent to 1 percent by weight of the phosphor, and a specific example is 0.5 percent by weight. The resulting thoroughly mixed materials are fired at a temperature of from about 925°C to about 1,200°C and the effect of varying the firing or reheat temperature on the output of the resulting lamps as shown in FIG. 5. Preferably the firing temperature is varied from 980°C to 1,180°C and a specific example is a firing temperature of about 1,060°C. As in the case of the phosphor which is initially preparing by firing solid-state raw-mix constituents, varying the firing time also has an effect on the performance of the lamps which incorporate the phosphor and this is shown in FIG. 6.

Another method for precipitating the halophosphate matrix with the activator incorporated therein is disclosed in copending application Ser. No. 109,988, filed Jan. 26, 1971 now U.S. Pat. No. 3,694,371, and owned by the present assignee. In practicing this method, there is prepared an aqueous solution having a pH of 6 to 7 and containing the following as essential constituents: alkaline-earth metal ions as a metal-organic complex which is dissociated only at elevated temperatures, such as calcium-ethylene-diaminetetracetic acid; sufficient phosphate-containing compound, such as phosphoric acid, to provide sufficient phosphate radical to react with all the phosphor metallic constituents in the solution; chlorine or fluorine ions included as the ammonium compound; and predetermined "activator" amounts of the activators antimony or antimony plus manganese, with the antimony included as potassium antimonyl tartrate and the manganese included as the acetate. When this solution is heated under pressure to 170°C, the apatite-structured matrix, which includes the activator, is precipitated. The separated precipitate is then heated to about 1,100°C to optimize the luminescent properties of the phosphor. The phosphor is thereafter processed in accordance with the present invention.

Still another method for precipitating the halophosphate matrix with activator incorporated therein is disclosed in copending application Ser. No. 87,578, filed Nov. 6, 1970, now U.S. Pat. No. 3,663,473 and owned by the present assignee. In practicing this method, a first aqueous solution including the alkaline-earth metal is prepared, for example calcium chloride in aqueous solution. A second solution is prepared which contains phosphate radical in slight excess over that amount required to react with the metallic constituents of the phosphor, for example a solution of diammonium phosphate. The fluorine is added to the second solution as ammonium fluoride, for example, and the antimony is activator proportions can be added to the first solution. The solutions are then mixed and digested at a temperature of at least 65°C to precipitate the alkaline-earth metal fluoroapatite. The pH of the solution is then raised to from 6 to 8.5 and manganese is added thereto in activator proportions, such as by adding manganese chloride, and the mixed solutions are digested at a temperature of at least 65°C. Upon firing the resulting separated precipitate at 1,100°C, for example, the luminescence of the material is optimized. Thereafter the phosphor is processed in accordance with the present invention.

Yet another method for precipitating the halophosphate matrix with activator incorporated therein is disclosed in copending application Ser. No. 77,701, filed Oct. 2, 1970, now abandoned and refiled as a continuation in Ser. No. 266,792 on June 27, 1972, and owned by the present assignee. In practicing this method, there is first prepared an acidic solution containing the alkaline-earth metal, phosphate radical, and the activator material, with or without the fluorine. As an example, the solution contains diammonium phosphate, calcium chloride, manganese chloride, antimony chloride, and a small amount of tartaric acid, with the solution being rendered acidic by the addition of hydrochloric acid. The solution is heated to a boil and urea then added to raise the pH to about 4.5. At this point, the activator doped calcium acid phosphate begins to precipitate, and when the pH is raised to about 5.5, the precipitate is separated. Fluorine can be added to the precipitate by slurrying same in an ammonium fluoride solution, and the resulting material is then fired at about 1,100°C to optimize the luminescence. Thereafter the phosphor is processed in accordance with the present invention.

I claim:

1. The method of improving the performance of an antimony-activated or antimony-plus manganese-activated apatite-structured matrix of halophosphate phosphor as used in fluorescent lamps, which method comprises:
   a. after said phosphor has initially been prepared by reacting the raw mix constituents therefor under predetermined conditions to render same luminescent, and said prepared phosphor is in finely divided status, mixing therewith finely divided antimony trifluoride in predetermined amount; in the case the initial processing of said phosphor has included precipitating from solution of phosphor raw-mix constituents said matrix having activator incorporated therein, said antimony trifluoride is added in amount of from 0.07 percent to 1.3 percent by weight of said phosphor; and in the case said phosphor has initially been prepared by firing phosphor raw-mix solid-state constituents under predetermined conditions, said antimony trifluoride is added in amount of from 0.07 percent to 0.85 percent by weight of said phosphor;
   b. firing the resulting mixture in an inert atmosphere at a temperature of from about 925°C to about 1,200°C for a period of from about one-quarter hour to about 3 ½ hours; and
   c. further processing the resulting fired material into finely divided form suitable for coating onto the envelopes of fluorescent lamps.

2. The method as specified in claim 1, wherein the initial processing of said phosphor has included precipitating from solution of raw-mix constituents said matrix having activator incorporated therein, said antimony trifluoride is added in amount of from 0.15 percent to 1 percent by weight of said phosphor, and said mixture is fired at a temperature of from 980°C to 1,180°C for a period of one-half hour to 3 hours.

3. The method as specified in claim 2, wherein said antimony trifluoride is added in amount of about 0.5 percent by weight of said phosphor, and said mixture is fired at a temperature of about 1,060°C for about 1 ½ hours.

4. The method as specified in claim 1, wherein said phosphor has initially been processed by firing phosphor raw-mix solidstate constituents under predetermined conditions, said antimony trifluoride is added in amount of from 0.2 percent to 0.7 percent by weight of said phosphor, and said mixture is fired at a temperature of from 980°C to 1,180°C for a period of from one-half hour to 3 hours.

5. The method as specified in claim 4, wherein said antimony trifluoride is added in amount of about 0.5 percent by weight of said phosphor and said mixture is fired at a temperature of about 1,080°C for about 1 ½ hours.

6. The method as specified in claim 1, wherein after said resulting mixture has been fired, said fired mixture is milled to finely divided status, said finely divided phosphor is washed in a dilute acid solution, thereafter water washed and then suspended in water to form a phosphor-water slurry, and the resulting slurry is then spray dried to provide finely divided phosphor suitable for coating onto the envelopes of fluorescent lamps.

7. The method as specified in claim 6, wherein said dilute acid solution is dilute solution of nitric acid.

* * * * *